US009297459B2

United States Patent
Falesnik

(10) Patent No.: US 9,297,459 B2
(45) Date of Patent: Mar. 29, 2016

(54) GATE VALVE

(71) Applicant: VAG—Armaturen GmbH, Mannheim (DE)

(72) Inventor: Miroslav Falesnik, Hroznova Lhota (CZ)

(73) Assignee: VAG—ARMATUREN GMBH, Mannheim (DE)

( * ) Notice: Subject to any disclaimer, the term of this patent is extended or adjusted under 35 U.S.C. 154(b) by 247 days.

(21) Appl. No.: 13/897,960

(22) Filed: May 20, 2013

(65) Prior Publication Data

US 2013/0313462 A1 Nov. 28, 2013

(30) Foreign Application Priority Data

May 26, 2012 (DE) .......................... 10 2012 010 466

(51) Int. Cl.
| | | |
|---|---|---|
| *F16K 25/00* | (2006.01) | |
| *F16K 3/00* | (2006.01) | |
| *F16K 3/14* | (2006.01) | |
| *F16K 3/02* | (2006.01) | |
| *F16K 3/18* | (2006.01) | |

(52) U.S. Cl.
CPC ................. *F16K 3/14* (2013.01); *F16K 3/0218* (2013.01); *F16K 3/186* (2013.01)

(58) Field of Classification Search
CPC ....... F16K 3/186; F16K 3/0218; B22D 41/24; B65D 90/587
USPC ......... 251/193, 194, 197, 198, 200, 203, 204, 251/326–329
See application file for complete search history.

(56) References Cited

U.S. PATENT DOCUMENTS

| 2,858,844 | A | * | 11/1958 | Gemma ........................ 137/246 |
| 4,291,862 | A | * | 9/1981 | Alvarez et al. ................ 251/167 |
| 4,700,927 | A | * | 10/1987 | Henderson .................... 251/158 |
| 7,359,082 | B2 | | 4/2008 | Keithley et al. |
| 2005/0094164 | A1 | | 5/2005 | Keithley et al. |
| 2011/0033266 | A1 | * | 2/2011 | Tateshita ................ F16K 51/02 414/217 |

FOREIGN PATENT DOCUMENTS

| DE | 60190 A5 | 11/1968 |
| DE | 4320185 A1 | 12/1994 |
| JP | H11201319 | 7/1999 |
| JP | 2011201319 A | 10/2011 |

* cited by examiner

*Primary Examiner* — John K Fristoe, Jr.
*Assistant Examiner* — Hailey K Do
(74) *Attorney, Agent, or Firm* — Paul D. Bianco; Gary S. Winer; Fleit Gibbons Gutman Bongini & Bianco PL

(57) ABSTRACT

A gate valve includes a valve plate located in a movable manner within a holder, a sealing for sealing off of the valve plate relative to the holder, and a wedge arrangement with several first wedge elements located on the valve plate in its direction of movement at a distance from one another, and second wedge elements belonging to the first wedge elements, by means of which the valve plate is pressed transverse to the direction of movement of the valve plate against the sealing with a movement into a closing position. In order to facilitate a low-friction actuation with a reduced actuation force, also in a compact and space-saving manner, the second wedge elements are supported on the holder, so that they can move relative to the holder.

14 Claims, 3 Drawing Sheets

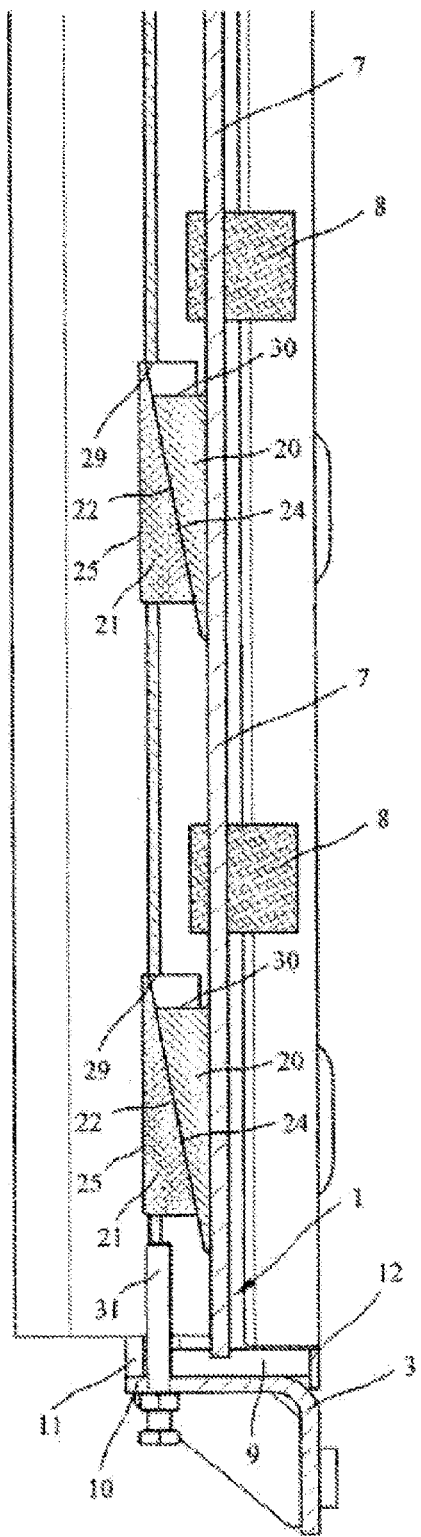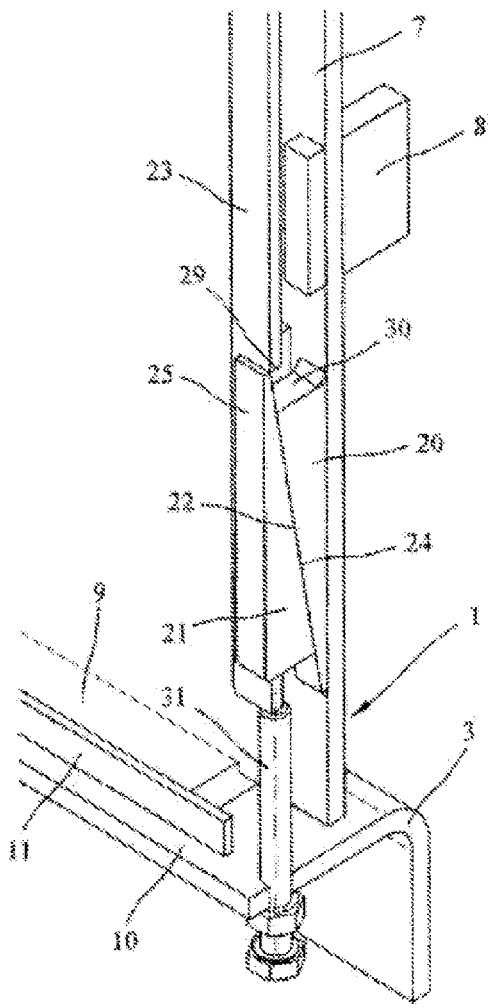
Fig. 2
Fig. 3

GATE VALVE

CROSS REFERENCE TO RELATED APPLICATIONS

This application claims priority under 35 U.S.C. §119 to German Patent Application No. 10 2012 010 466.9 filed 26 May 2012, the entire contents of which are incorporated herein by reference.

FIELD OF THE INVENTION

The invention concerns a gate valve.

BACKGROUND OF THE INVENTION

A gate valve is known from DE 43 20 185 A1. There, a valve plate is conducted in a movable manner within a rack frame that can be installed on a wall in front of an outlet opening. A sealing arrangement with two ring seals situated on each side of a sealing ring is provided in the area of a passage in a wall plate of the rack frame. By means of a wedge arrangement with several wedge pieces arranged on the gate valve and the rack frame, the gate valve is pressed, transverse to its movement direction against the sealing arrangement, when the valve plate arrives at a closing position covering the passage.

With such gate valves with a wedge system, the valve plate is moved, during almost its entire stroke, with a clearance within the rack frame. Only at the end of the closing stroke is the wedging of the wedge pieces that are firmly arranged on the valve plate and the rack frame effective, so that the valve plate is pressed against the sealing only just before the complete shutoff. In this way, the friction and the actuating force can be decreased and the wear and tear, reduced. However, the valve plate lifts off relatively fast from the sealing upon opening, so that a leakage also appears quickly on the entire valve plate. Since the wedge pieces affixed on the valve plate and the rack frame must be moved, collision-free, past one another during the stroke movement, a lateral movement of the wedge pieces is also required. Especially with larger gate valve dimensions with several wedge pieces located above one another, therefore, the side sections of the rack frame must have a corresponding width and stability. For this reason, however, the use of material and the size are increased.

Therefore, gate valves are also already known, in which the valve plate, conducted almost free of play in outlining frame profiles, is pressed in a defined manner against the individual sealing profile by means of slide profiles made of plastic as a rule. With such a structure, only the actual gate valve opening is released, whereas the areas on which valve plate and sealing are in contact are tight. Furthermore, the valve plate is conducted free of play during the entire stroke, wherein vibrations can be avoided during operation. However, since the valve plate is pressed during the entire stroke with the sealing, correspondingly higher actuation forces are needed for the movement of the valve plate. As a result of the constant pressing of the valve plate with the sealing, the friction during the actuation is also increased and thus, also the wear and tear of the sealing. If leakage occurs, moreover, the sealing force cannot be increased further.

SUMMARY OF THE INVENTION

One aspect of the invention relates to a gate valve that, with a compact and space-saving design, makes possible an actuation as low-friction as possible, with a reduced actuation force.

With the gate valve in accordance with an embodiment of the invention, only the wedge elements located on the valve plate are firmly connected with the valve plate, whereas the associated second wedge elements are supported on the holder so that they can be moved relative to the holder, and are moved along with a shift of the gate valve plate. In this way, several wedge elements are located, in the direction of movement, in a line one behind the other and need not be moved laterally, with respect to one another. Thus, even larger gate valves can also be conducted on the entire length in relatively narrow side profiles. The entire construction and, in particular, the side guides with the wedge elements to press the gate valve plate against a seal, herein a sealing, can thus be constructed in an extremely compact and space-saving manner. The second wedge elements located in the direction of movement of the gate valve plate in a line behind one another are situated on a common slide rail. In this way, the second wedge elements can be jointly moved. The second wedge elements can, for example, be inserted in recesses within the slide rail.

In a particularly advantageous embodiment, the holder is constructed in the form of a frame with two side profiles designed as frame profiles to guide the valve plate on its two longitudinal sides. As a result of the not required lateral displacement of the wedge elements, the side profiles can be constructed extremely compact and with flexural rigidity.

The slide rail expediently has at least one contact surface for the carrying of the slide rail by a first wedge element with the shifting of the valve plate into an open position. In this way, with a shifting of the valve plate into an open position by the first wedge elements via the slide rail, the second wedge elements can be carried along.

In another advantageous embodiment, the second wedge elements can contain elevated side walls. In this way, the first wedge elements can be conducted laterally within the second wedge elements.

In a particularly advantageous manner, the valve plate is conducted in a movable manner within the side profiles of the holder designed as a frame by the second element and a guide element that is located on the valve plate. By means of these two parts, a slide bearing function with little play and a defined minimum pressing between the valve plate and sealing can be guaranteed over the entire stroke. The second wedge elements and the guide elements can be made of plastic, so that low frictional torques and reduced actuation forces are produced during the stroke. In this way, the advantages of known sliding and wedge gate valve systems are combined without restrictions.

BRIEF DESCRIPTION OF THE DRAWINGS

Additional special features and advantages of the invention can be deduced from the following description of a preferred embodiment example with the aid of the drawing. The figures show the following:

FIG. 2, a part of the gate valve shown in FIG. 1 in a longitudinal section;

FIG. 3, a guide of the gate valve in a perspective; and

DETAILED DESCRIPTION OF THE INVENTION

Figure 1:
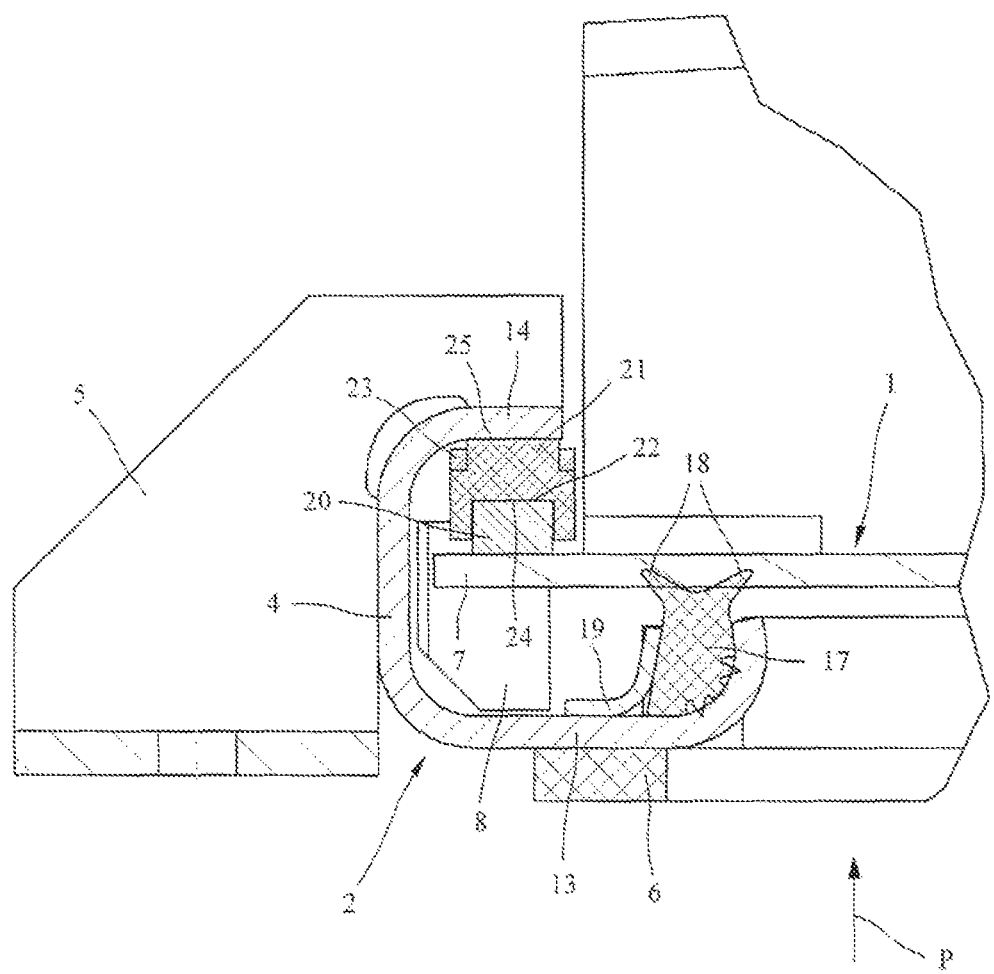
FIG. 1, a part of a gate valve in accordance with the invention in a cross-section.

FIG. 1 shows a part of a gate valve, which can be used, for example, to shut off waste water in basins. The gate valve contains a rectangular, square, or round gate valve 1, which is located in a movable manner within a holder 2, which is constructed here as a frame. In the embodiment shown, the frame-shaped holder 2 comprises a lower closing profile 3 shown in FIGS. 2 to 4, and two parallel side profiles 4, which can be seen in FIG. 1, in which the valve plate 1 is conducted laterally. The frame-like holder 2 with the horizontal, lower closing profile 3 and the vertical side profiles 4 provided with retainer pieces 5 can be sealed off, for example, with a sealing 6 and fastened on the outside of a wall of a basin, or the like, provided with a passage. On the valve plate 1, the water pressure can then act in the direction of the arrow P shown in FIG. 1. The valve plate 1, however, can also be located in a movable manner as a gate in a corresponding holder of a channel or a groove or in a suitable guide of a housing.

In the depicted housing-free embodiment, the valve plate 1 is conducted in a movable manner on its two longitudinal sides 7 via guide elements 8 into the two side profiles 4, parallel relative to one another, of the holder 2, which is constructed as a frame, and in a lower closing position, is on a bottom gasket 9 situated on the lower closing profile 3. The bottom gasket 9 shown in FIGS. 2 and 3 is located on an upper leg 10 of the lower closing profile 3, constructed as an angular profile, between a front and back retaining strip 11 and 12. By means of a spindle drive, which is in fact known and therefore not depicted, the valve plate 1 can be moved upwards into an opening position for the clearance of a passage from the lower closing position shown in FIGS. 2 and 3.

The side profiles 4 are constructed in accordance with FIG. 1 as open frame profiles with an inside leg 13 and an outside leg 14. Between the inside leg 13 and the outside leg 14 of the two side profiles 4, the valve plate 1 is conducted in a movable manner via the guide elements 8, shown also in FIGS. 2 to 3. In accordance with FIG. 4, the guide elements 8, which are preferably made of plastic, can be stuck on the longitudinal sides 7 of the valve plate 1 via a slot 15, and held within a recess 16.

A sealing 17, which is shown in FIG. 1, is located within the side profiles 4; it contains sealing lips 18 adjacent to the valve plate 2. In the embodiment shown, the sealing 17 lies close to the inside leg 13 of the side profile 4 and is held by a retaining crosslink 19 welded onto the inside of the inside leg 13. Furthermore, inside the side profiles 4 is a wedge arrangement with several first wedge elements 20 located on the two longitudinal sides 7 of the valve plate 1 in its direction of movement in a line one behind the other, and second wedge elements 21, which engage with the first wedge elements. The first wedge elements 20, which are preferably made of metal and are welded to the valve plate 2, have a wedge surface 22 that faces the second wedge elements 21. The second wedge elements 21 are located on a movable slide rail 23. On the side pointing to the first wedge elements 20, they have a second wedge surface 24 corresponding to the first wedge surface 22, and on the side opposite the second wedge surface 24, a straight contact surface 25 for contact on the inside of the outside leg 14 of the side profile 4.

Figure 4:
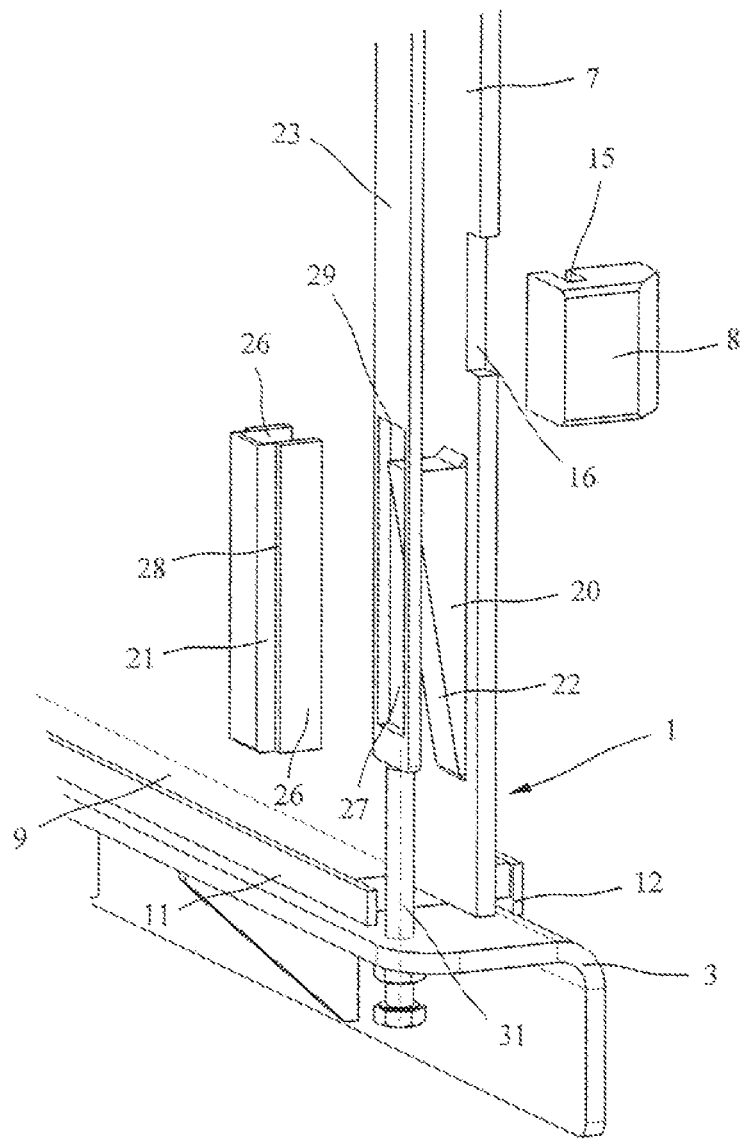
FIG. 4, the guide of the gate valve in an exploded view.

As can be seen in FIG. 4, the second wedge elements 21 have a quadrangular outer contour with elevated side walls 26. The first wedge elements 20 are conducted in a movable manner between the two side walls 26 of the second wedge elements 21. The second wedge elements 21 are inserted into rectangular recesses 27 of the slide rail 23 and have on the outsides of the two side walls 26 a step 28 for retention within the recesses 27. Corresponding to the first wedge elements 20, the associated second wedge elements 21 are located in the direction of movement of the valve plate 1 in a line one behind the other and not staggered laterally relative to one another.

From FIGS. 2 and 3, one can see that the second wedge surface 24 of the second wedge element 21 inserted into the recess 27 of the slide rail 23 runs in such a way that at the transition to the slide rail 23 on the upper end of the recess 27, a contact surface 29 is formed for the carrying along of the slide rail 23 by the first wedge elements 20 during the movement of the valve plate 1 into the opening position. The first and second wedge elements 20 and 21 are situated in such a way that with the movement of the valve plate 1 into the opening direction, the first wedge element 20, pressed by the water pressure against the second wedge element 21, reaches with the upper end surface 30 the contact surface 29 on the recess 27 in the slide rail. On the lower closing profile 3, adjustable contacts 31 are located as a lower contact for the two slide rails 23 on the two longitudinal sides 7 of the valve plate 1. In the embodiment shown, the adjustable contacts are constructed as adjusting screws with lock nuts.

Below, the mode of functioning of the shutoff valve in accordance with the invention is explained with the aid of FIGS. 2 and 3.

If the valve plate 1 is moved upwards from the closing position shown in FIGS. 2 and 3, the first wedge elements 20 fastened on the valve plate 1 slide with their wedge surfaces 22 past the wedge surfaces 24 of the second wedge elements 21 located on the slide rail until the upper end surfaces 30 of the first wedge elements 20 acting as carrying surfaces arrive at the contact surfaces 29 of the slide rails 23. The pressing between the slide plate 1 and the sealing 17 shown in FIG. 1 is thereby reduced. In another upward movement, the first wedge elements 20 carry along the second wedge elements 21 upwards via the slide rail 23 for the rest of the stroke. The valve plate 1 is conducted by the quadrangular guide elements 8, which are preferably made of plastic, and the second wedge elements 21, which are likewise preferably made of plastic, in a sliding manner almost free of play within the side profiles 4.

If, on the other hand, the valve plate 1 is moved downwards from an upper open position, then the second wedge elements 21 are carried along by means of the first wedge elements 20 until the slide rails 23, shortly before arriving at the valve plate 1 at the bottom gasket 9, reach with their lower end the contacts 31 constructed as adjusting screws. In the further downward movement of the valve plate 1 with the welded first wedge elements 20, the latter move further on the wedge surfaces 24 of the second wedge elements 21, which are likewise preferably made of plastic. The valve plate 1 is thereby pressed in the direction of the sealing lips 18 of the sealing 17, whereby the sealing effect is increased.

All references cited herein are expressly incorporated by reference in their entirety. In addition, unless mention was made above to the contrary, it should be noted that all of the accompanying drawings are not to scale. There are many different features to the present invention and it is contemplated that these features may be used together or separately. Thus, the invention should not be limited to any particular combination of features or to a particular application of the invention. Further, it should be understood that variations and modifications within the spirit and scope of the invention might occur to those skilled in the art to which the invention pertains. Accordingly, all expedient modifications readily attainable by one versed in the art from the disclosure set forth herein that are within the scope and spirit of the present invention are to be included as further embodiments of the present invention.

What is claimed is:

1. A gate valve, comprising:
   a holder;

a valve plate slidably retained within the holder to be moveable in an opening and closing direction within the holder;

a seal for sealing the valve plate relative to the holder;

a plurality of first wedge elements located on the valve plate and aligned along the opening and closing direction of movement of the valve plate and spaced at a distance from one another;

a plurality of second wedge elements, each of the plurality of second wedge elements mateable with one of the plurality of first wedge elements to press the valve plate in a direction transverse to the opening and closing direction of movement of the valve plate and against the seal when the plurality of first and the plurality of second wedge elements slide against each other; and a slide rail connected to the plurality of second wedge elements and having a plurality of recesses therein into each of which one of the plurality of second wedge elements is inserted, the slide rail connectable to the valve plate to slide the plurality of second wedge elements in the opening and closing direction of movement of the valve plate when the valve plate is moved in the opening and closing direction.

2. The gate valve according to claim 1, wherein the slide rail has at least one contact surface contactable by one of the plurality of first wedge elements when the valve plate is moved in the opening and closing direction, thereby moving the slide rail in the opening and closing direction and moving the plurality of second wedge elements in the opening and closing direction.

3. The gate valve according to claim 1, wherein a wedge surface of an edge of one of the plurality of first wedge elements contacts a contact surface at an upper end of one of the plurality of recesses, thereby moving the slide rail in the opening and closing direction as the valve plate is moved in the opening and closing direction.

4. The gate valve according to claim 1, wherein the plurality of second wedge elements has elevated side walls.

5. The gate valve according to claim 1, further including a stop element engageable with the slide rail to stop movement of the slide rail and the plurality of second wedge elements while the valve plate is moving in a closing direction, thereby causing the plurality of first and the plurality of second wedge elements to slide against each other.

6. The gate valve according to claim 1, further including a plurality of guide elements configured to support slidable movement of the valve plate within the holder, each of the plurality of guide elements including a slot sized to accept entry of an edge of the valve plate, each of the plurality of guide elements moveable in a direction transverse to the opening and closing direction of movement of the valve plate.

7. The gate valve according to claim 1, wherein the holder is formed as a frame having two side channels which receive edges of the valve plate to support and guide the valve plate.

8. The gate valve according to claim 7, wherein the valve plate is configured to be guided along the opening and closing direction within the two side channels of the holder by at least one moveable guide element within each channel, the at least one movable guide element including a slot to slideably retain an edge of the valve plate.

9. A valve gate, comprising:
a holder;
a valve plate slidably retained within the holder to be moveable in an opening and closing direction within the holder;
a seal for sealing the valve plate relative to the holder;
a plurality of first wedge elements located on the valve plate and aligned along the opening and closing direction of movement of the valve plate and spaced at a distance from one another;

a plurality of second wedge elements, each of the plurality of second wedge elements mateable with one of the plurality of first wedge elements to press the valve plate in a direction transverse to the opening and closing direction of movement of the valve plate and against the seal when the plurality of first and the plurality of second wedge elements slide against each other; and a slide rail connected to the plurality of second wedge elements and connectable to the valve plate to slide the plurality of second wedge elements in the opening and closing direction of movement of the valve plate when the valve plate is moved in the opening and closing direction, the slide rail having at least one contact surface contactable by one of the plurality of first wedge elements when the valve plate is moved in the opening and closing direction, thereby moving the slide rail in the opening and closing direction and moving the plurality of second wedge elements in the opening and closing direction.

10. A gate valve, comprising:
a holder having a sealing surface;
a valve plate slidably retained within the holder to be moveable in an opening and closing direction within the holder;
a plurality of first wedge elements connected to the valve plate aligned successively along the opening and closing direction of movement of the valve plate and spaced at a distance from one another;
a plurality of second wedge elements, each of the plurality of second wedge elements mateable with one of the plurality of first wedge elements to press the valve plate in a direction transverse to the opening and closing direction of movement of the valve plate and against the sealing surface when the plurality of first and the plurality of second wedge elements slide against each other; and
a slide rail surrounding each of the plurality of second wedge elements and including a contact surface engageable by one of a plurality of first wedge elements, thereby sliding the plurality of second wedge elements in the opening and closing direction of movement of the valve plate when the valve plate is moved in the opening and closing direction.

11. The gate valve according to claim 10, further including a stop element engageable with the slide rail to stop movement of the slide rail and the plurality of second wedge elements while the valve plate is moving in the closing direction, thereby causing the plurality of first and the plurality of second wedge elements to slide against each other.

12. The gate valve according to claim 10, further including a plurality of guide elements configured to support slidable movement of the valve plate within the holder, each of the plurality of guide elements including a slot sized to accept entry of an edge of the valve plate, each of the plurality of guide elements moveable in a direction transverse to the opening and closing direction of movement of the valve plate.

13. The gate valve according to claim 12, further including a stop element having an adjustment element configured to position the stop element along the opening and closing direction of the valve plate.

14. The valve plate according to claim 13, wherein the adjustment element is a screw and lock nut.

\* \* \* \* \*